US012769963B2

(12) United States Patent
Farris

(10) Patent No.: US 12,769,963 B2
(45) Date of Patent: Oct. 20, 2026

(54) COMPOSITE MATERIAL MARKING AND IDENTIFICATION

(71) Applicant: RTX Corporation, Farmington, CT (US)

(72) Inventor: John R. Farris, Lebanon, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/788,637

(22) Filed: Jul. 30, 2024

(65) Prior Publication Data

US 2024/0394489 A1 Nov. 28, 2024

Related U.S. Application Data

(62) Division of application No. 16/576,944, filed on Sep. 20, 2019, now Pat. No. 12,099,894.

(51) Int. Cl.
*G06K 7/10* (2006.01)
*B32B 5/10* (2006.01)
(Continued)

(52) U.S. Cl.
CPC ............ *G06K 7/10544* (2013.01); *B32B 5/10* (2013.01); *B32B 18/00* (2013.01); *F01D 5/147* (2013.01);
(Continued)

(58) Field of Classification Search
CPC ...... G06K 7/10544; B32B 5/10; B32B 18/00; B32B 2603/00; B32B 5/26; B32B 2260/023; B32B 2260/04; B32B 2262/105; B32B 5/024; F01D 5/147; F01D 17/16; F01D 5/284; F01D 5/282; F05D 2250/28; F05D 2300/6033; C04B 35/565; C04B 2235/5244; C04B 2235/5256; C04B 35/80; Y02T 50/60
See application file for complete search history.

(56) References Cited

U.S. PATENT DOCUMENTS 5,437,538 A * 8/1995 Mitchell ............... F01D 21/045 428/105
5,511,426 A 4/1996 Clement et al.
(Continued)

FOREIGN PATENT DOCUMENTS

EP 2778645 A1 9/2014

OTHER PUBLICATIONS

European Search Report corresponding to EP Application No. 23216013.5; Mailing Date, Mar. 26, 2024.
(Continued)

*Primary Examiner* — Thien M Le
*Assistant Examiner* — Asifa Habib
(74) *Attorney, Agent, or Firm* — CANTOR COLBURN LLP

(57) ABSTRACT

An example method for manufacturing a component of a gas turbine engine is provide. The method includes forming a tow of filaments of a fiber material. The method further includes weaving the tow together with other tows to form a sheet of the fiber material. The method further includes forming the component from the sheet of fiber material, the component comprising a designated surface area having a unique pattern created from properties of the fiber material.

18 Claims, 5 Drawing Sheets

(51) Int. Cl.
*B32B 18/00* (2006.01)
*F01D 5/14* (2006.01)
*F01D 17/16* (2006.01)

(52) U.S. Cl.
CPC .......... *F01D 17/16* (2013.01); *B32B 2603/00* (2013.01); *F05D 2250/28* (2013.01)

(56) References Cited

U.S. PATENT DOCUMENTS

| | | | | |
|---|---|---|---|---|
| 5,763,079 | A | 6/1998 | Hanusiak et al. | |
| 6,294,125 | B1 | 9/2001 | Bridgewater et al. | |
| 6,485,796 | B1 | 11/2002 | Carpenter et al. | |
| 6,627,019 | B2 * | 9/2003 | Jarmon | C04B 35/80 264/642 |
| 8,540,914 | B2 | 9/2013 | Wilde et al. | |
| 8,834,985 | B2 | 9/2014 | Preisler et al. | |
| 9,162,436 | B2 | 10/2015 | Nelson et al. | |
| 9,984,261 | B2 | 5/2018 | Gonzales, Jr. | |
| 10,676,391 | B2 * | 6/2020 | Harrison | C23C 16/483 |
| 10,762,407 | B2 | 9/2020 | Gold | |
| 11,046,615 | B2 | 6/2021 | Tang et al. | |
| 11,346,228 | B1 * | 5/2022 | Burdette | F01D 9/044 |
| 12,055,056 | B2 * | 8/2024 | Hazel | F01D 11/10 |
| 12,392,252 | B2 * | 8/2025 | Lutjen | F01D 11/08 |
| 2002/0058107 | A1 | 5/2002 | Fareed et al. | |
| 2002/0076541 | A1 * | 6/2002 | Jarmon | F23R 3/007 264/44 |
| 2003/0207155 | A1 | 11/2003 | Morrison et al. | |
| 2006/0024466 | A1 | 2/2006 | Hanusiak et al. | |
| 2007/0059162 | A1 | 3/2007 | Nolfi et al. | |
| 2008/0132398 | A1 * | 6/2008 | Kostar | F01D 5/284 501/1 |
| 2009/0067987 | A1 | 3/2009 | Pellet et al. | |
| 2010/0081350 | A1 * | 4/2010 | McCabe | C04B 35/62868 442/127 |
| 2014/0286765 | A1 | 9/2014 | Hoyland et al. | |
| 2014/0369848 | A1 | 12/2014 | Marchal et al. | |
| 2015/0308337 | A1 * | 10/2015 | Marasco | F01D 5/14 235/494 |
| 2016/0068446 | A1 * | 3/2016 | Sheedy | C04B 35/573 264/28 |
| 2016/0107764 | A1 | 4/2016 | O'Kell et al. | |
| 2016/0136925 | A1 * | 5/2016 | Chamberlain | C04B 35/62844 428/113 |
| 2016/0319694 | A1 | 11/2016 | Hovis et al. | |
| 2017/0320232 | A1 * | 11/2017 | de Diego | B32B 1/08 |
| 2017/0348876 | A1 | 12/2017 | Lin et al. | |
| 2018/0266264 | A1 | 9/2018 | Kerns et al. | |
| 2019/0169724 | A1 | 6/2019 | Coyle et al. | |
| 2020/0025034 | A1 * | 1/2020 | Kling | F01D 25/24 |
| 2020/0216365 | A1 * | 7/2020 | Jackson | C04B 35/80 |
| 2020/0255345 | A1 * | 8/2020 | Clark | C04B 35/80 |
| 2020/0378260 | A1 | 12/2020 | Wakashima et al. | |
| 2020/0392049 | A1 * | 12/2020 | Razzell | C04B 41/87 |
| 2021/0009789 | A1 * | 1/2021 | Soheilian | B32B 9/005 |
| 2021/0060866 | A1 * | 3/2021 | Nation | C04B 35/80 |
| 2021/0087726 | A1 * | 3/2021 | Pegna | B33Y 70/00 |
| 2023/0094750 | A1 | 3/2023 | Edmonds et al. | |
| 2023/0192561 | A1 | 6/2023 | Read et al. | |
| 2023/0193541 | A1 | 6/2023 | Read et al. | |
| 2023/0241873 | A1 * | 8/2023 | Pujar | B32B 5/265 442/1 |
| 2023/0407532 | A1 * | 12/2023 | Lenz | C04B 35/565 |
| 2024/0084707 | A1 * | 3/2024 | Lieu | F01D 5/282 |
| 2024/0417063 | A1 * | 12/2024 | Kryj-Kos | B64C 11/26 |
| 2025/0137378 | A1 * | 5/2025 | Jain | F01D 5/282 |

OTHER PUBLICATIONS

European Search Report Issued in European Application No. 20196736.1-1004 dated Feb. 24, 2021; 11 Pages.
European Search Report Issued in European Application No. 20196736.1-1004 dated Jul. 22, 2021; 9 Pages.
US Advisory Action corresponding to U.S. Appl. No. 16/576,944; Issued, Jan. 31, 2023.
US Final Office Action corresponding to U.S. Appl. No. 16/576,944; Issued, Aug. 3, 2023.
US Final Office Action corresponding to U.S. Appl. No. 16/576,944; Issued, Nov. 8, 2022.
US Non-Final Office Action corresponding to U.S. Appl. No. 16/576,944; Issued, Apr. 14, 2022.
US Non-Final Office Action corresponding to U.S. Appl. No. 16/576,944; Issued, Mar. 16, 2023.
US Notice of Allowance corresponding to U.S. Appl. No. 16/576,944; Issued, May 1, 2024.

* cited by examiner

COMPOSITE MATERIAL MARKING AND IDENTIFICATION

CROSS REFERENCE TO RELATED APPLICATIONS

The present application is a division of U.S. application Ser. No. 16/576,944 filed Sep. 20, 2019, the contents of which are incorporated herein by reference thereto.

BACKGROUND

Exemplary embodiments pertain to the art of high-temperature fibers and high-temperature fiber composites, including ceramic matrix composites.

Composite components are finding increased use in aerospace applications due to their unique, tailorable properties which can result in significant weight savings, increased performance and durability, as well as reductions in specific fuel consumption. In particular, gas turbine engines, such as aircraft engines, operate in severe environments and show significant benefit from incorporation of composite materials. Additionally, other aerospace components, such as aircraft brakes and friction materials, can benefit from incorporating composite materials.

As an example, ceramic matrix composite (CMC) components have desirable high temperature mechanical, physical, and chemical properties, which enable gas turbine engines to operate at much higher temperatures with significant weight savings as compared to current engines with superalloy components. Ceramic matrix composites include fibers embedded in a ceramic matrix.

BRIEF DESCRIPTION

Disclosed is a method for manufacturing a component of a gas turbine engine. The method includes forming a tow of filaments of fiber material. The method further includes weaving the tow together with other tows to form a sheet of the fiber material. The method further includes forming the component from the sheet of fiber material, the component comprising a designated surface area having a unique pattern created from properties of the fiber material.

In addition to one or more of the features described above, or as an alternative to any of the foregoing embodiments, the fiber material is ceramic matrix composite material.

In addition to one or more of the features described above, or as an alternative to any of the foregoing embodiments, the fiber material is an organic matrix composite material.

In addition to one or more of the features described above, or as an alternative to any of the foregoing embodiments, the component is a guide vane of the gas turbine engine.

In addition to one or more of the features described above, or as an alternative to any of the foregoing embodiments, the component is a fan blade of the gas turbine engine.

In addition to one or more of the features described above, or as an alternative to any of the foregoing embodiments, the designated surface area of the component is located in a non-gas-path-flow location.

In addition to one or more of the features described above, or as an alternative to any of the foregoing embodiments, the designated surface area of the component is located on an un-machined surface of the component.

In addition to one or more of the features described above, or as an alternative to any of the foregoing embodiments, the method further includes rigidizing the component subsequent to forming the component to prevent the properties of the fiber material from changing.

In addition to one or more of the features described above, or as an alternative to any of the foregoing embodiments, the unique pattern is created from the properties of the fiber material and properties of the tow.

In addition to one or more of the features described above, or as an alternative to any of the foregoing embodiments, forming the component from the sheet of fiber material includes forming the component from a plurality of sheets of the fiber material, wherein the designated surface area is on an outermost sheet of the plurality of sheets of the fiber material.

Also disclosed is a method of identifying a component of a gas turbine engine. The method includes identifying a type of the component from a plurality of component types of the gas turbine engine. The method further includes identifying a location of a unique pattern, the unique pattern being on a designated surface area of the component, the component being formed from a fiber material comprising a tow of filaments of the fiber material, the unique pattern created from properties of the fiber material and the tow. The method further includes scanning, using a scanner, the location of the unique identifier to uniquely identify the component.

In addition to one or more of the features described above, or as an alternative to any of the foregoing embodiments, the scanner is an optical scanner.

In addition to one or more of the features described above, or as an alternative to any of the foregoing embodiments, the scanner is a laser scanner.

In addition to one or more of the features described above, or as an alternative to any of the foregoing embodiments, the further method further comprises receiving, from a database, data about the component based at least in part on the unique identifier.

In addition to one or more of the features described above, or as an alternative to any of the foregoing embodiments, the location of the unique identifier is based at least in part on the type of the component.

In addition to one or more of the features described above, or as an alternative to any of the foregoing embodiments, the fiber material is ceramic matrix composite material.

In addition to one or more of the features described above, or as an alternative to any of the foregoing embodiments, the fiber material is an organic matrix composite material.

In addition to one or more of the features described above, or as an alternative to any of the foregoing embodiments, the designated surface area of the component is located in a non-gas-path-flow location.

In addition to one or more of the features described above, or as an alternative to any of the foregoing embodiments, the designated surface area of the component is located on an un-machined surface of the component.

In addition to one or more of the features described above, or as an alternative to any of the foregoing embodiments, the unique pattern is of a minimum size to ensure uniqueness.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
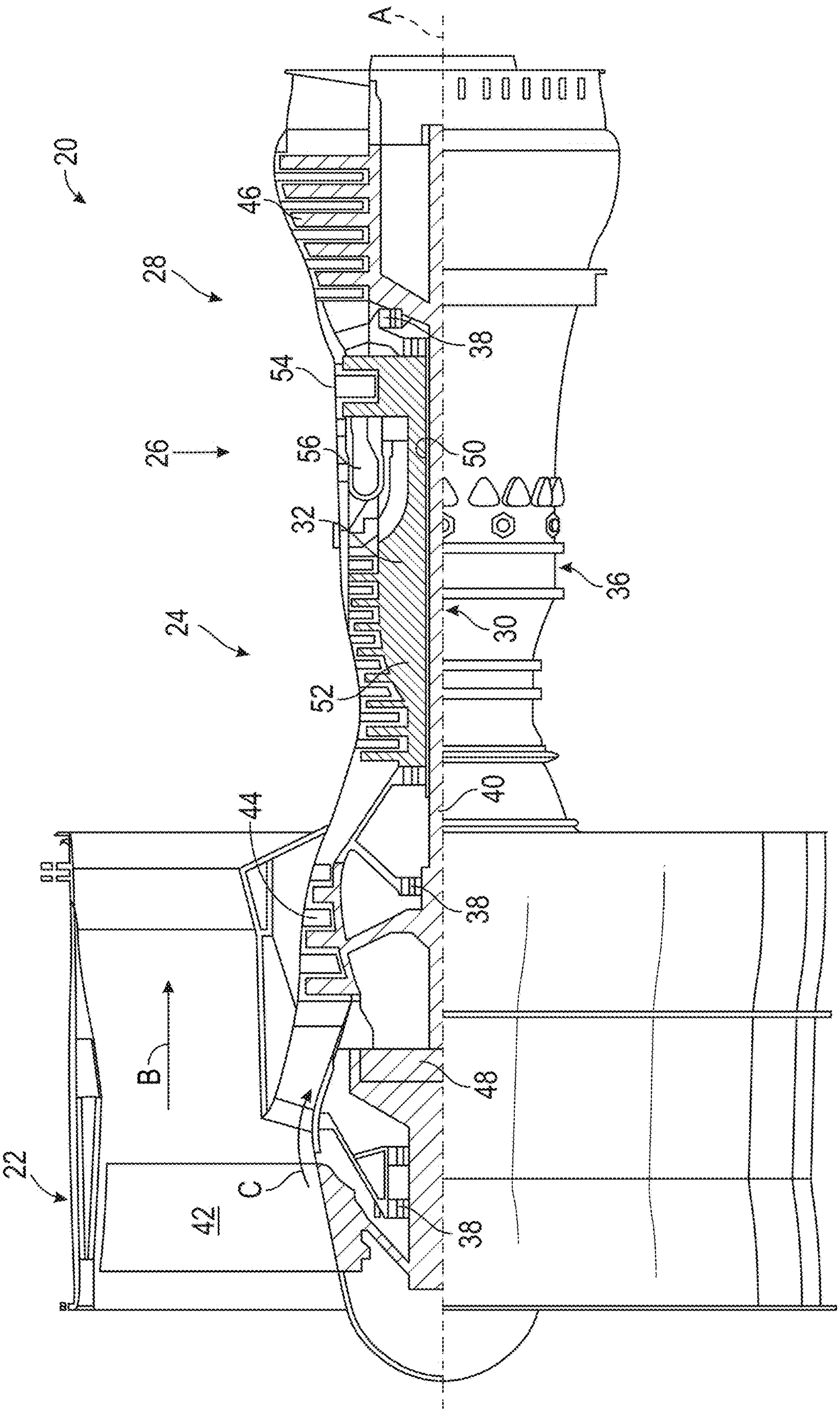
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine

46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8M ach and about 35,000 feet (10,688 meters). The flight condition of 0.8 Mach and 35,000 feet (10,688 meters), with the engine at its best fuel consumption—also known as “bucket cruise Thrust Specific Fuel Consumption (‘TSFC’)”—is the industry standard parameter of lbm of fuel being burned divided by lbf of thrust the engine produces at that minimum point. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45. “Low corrected fan tip speed” is the actual fan tip speed in ft/sec divided by an industry standard temperature correction of $[(\text{Tram } ^\circ\text{R})/(518.7^\circ\text{R})]^{0.5}$. The “Low corrected fan tip speed” as disclosed herein according to one non-limiting embodiment is less than about 1150 ft/second (350.5 m/sec).

Synthetic fiber composite materials (also referred to as “fiber materials”) produce fabric-like surfaces, which can be used to form components. For example, components of the gas turbine engine 20 can be formed using synthetic fiber composite materials, such as CMC, organic matrix composite (OMC), and the like. CMC components have desirable high temperature mechanical, physical, and chemical properties, which enable gas turbine engines to operate at much higher temperatures with significant weight savings as compared to current engines with superalloy components. Ceramic matrix composites include fibers embedded in a ceramic matrix.

Figure 2:
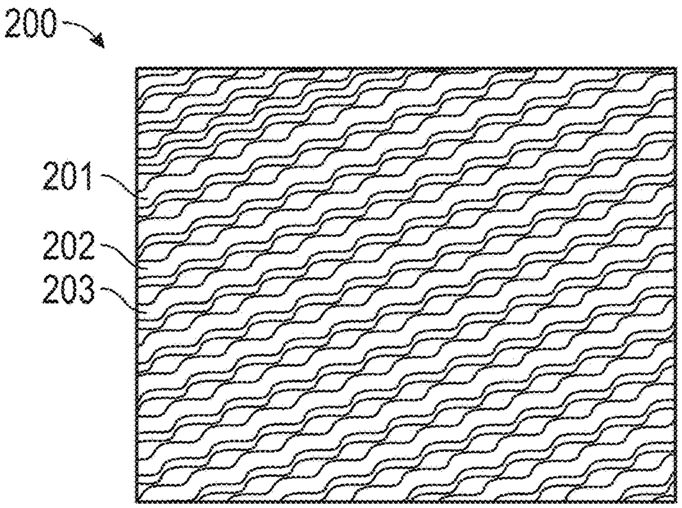
FIG. 2 is a sheet of ceramic matrix composite fiber material according to an embodiment described herein.

FIG. 2 shows an example sheet 200 of CMC fiber material. As shown, the sheet 200 of CMC fiber material is formed by tows 201, 202, 203 of fiber material woven together. The tows 201, 202, 203 represent groupings of individual filaments of fiber materials of CMC fiber material. The sheet 200 can be formed into different shapes to form components. In some examples, multiple sheets can be layered together to form the components.

Examples of components that can be formed using one or more sheets of synthetic fiber composite materials, such as CMC (in one non-limiting exemplary embodiment for example, SiC fibers and SiC matrix) or OMC, include a guide vane of a gas turbine engine, a fan blade of a gas turbine engine, and the like, including one or more of the components depicted in FIG. 1 and described herein.

In some situations, it may be desirable to uniquely identify components of gas turbine engines. By uniquely identifying the components, data about the components can be generated and stored to a database and can later be referenced. For example, information (e.g., date of manufacture, location of manufacture, technical data, type of component, type of material, lifetime estimation data, etc.) about a component can be stored in a database and referenced using a unique identifier associated with the component.

One example of a conventional technique for uniquely identifying a component is to mark the component using two-dimensional (2D) dot matrix marking. However, in some situations, such as in gas turbine engines, such marking techniques are ineffective. For example, 2D dot matrix marking on CMC or OMC components can be difficult to read/scan after engine exposure. Heat, high-velocity air or gas, and other forces can distort, alter, cover, or erode such conventional marking techniques, rendering them ineffective.

To overcome the deficiencies of conventional component marking techniques, the present techniques identify components that are made from synthetic fiber composite materials (also referred to as "fiber materials") by using properties of the fiber materials and/or properties of the tows. Because of the unique fabric structure (i.e., "properties") of CMCs and OMCs, a distinct unique pattern is created unique to each component. Thus, each component has a unique pattern that distinguishes it from other components. This is similar to human fingerprints or retinas in that the properties are unique to each component. Accordingly, individual components can be identified using those properties, which can be associated with data about the component, such as a serial number and component manufacturing history information.

During the manufacture of the component, the component is rigidized and the properties of the fiber material do not change even with further processing. When the component is installed in the gas turbine engine (or a sub-assembly thereof), a designated surface area of the component is scanned and recorded into a database. As the component progresses through manufacturing and into an assembled engine, and eventually to the field and overhauled, the component can be scanned by a scanner to determine the individual component by its unique pattern. Thus, the disclosed techniques use the unique pattern of the fiber materials to create an identifier for the component, eliminating the need for additional marking and providing a permanent method of identification of the component. The unique pattern is of a minimum size that ensures uniqueness. The minimum size can be determined, for example, based on how much variance exists in the fiber material and/or the tows. The minimum size can also be determined, for example, based on how many components are to be identified. For example, the minimum size may be larger if more components are to be identified, thus ensuring uniqueness. In examples, the minimum size may increase when the variance in the fiber material and/or the tows decreases. Similarly, the minimum size may decrease when the variance in the fiber material and/or the tows increases.

Figure 3:
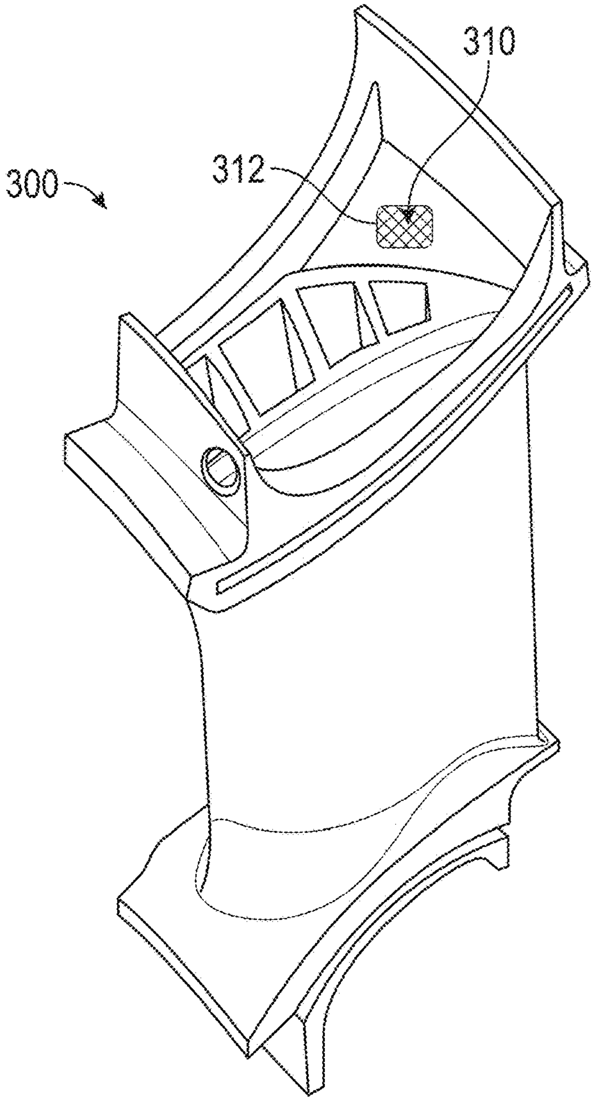
FIG. 3 is a guide vane of a gas turbine engine having an indicator associated therewith according to an embodiment described herein.

FIG. 3 depicts a guide vane 300 of a gas turbine engine (e.g., the gas turbine engine 20 of FIG. 1) having a unique pattern 310 associated therewith according to an embodiment described herein. The unique pattern 310 is located within a designated surface area 312 on the guide vane 300. The designated surface area 312 is a known, pre-determined area that can be scanned to identify the component by recognizing the unique pattern 310. The designated surface area 312 may be the same for each guide vane 300 such that the location of the designated surface area 312 is known.

Figure 4:
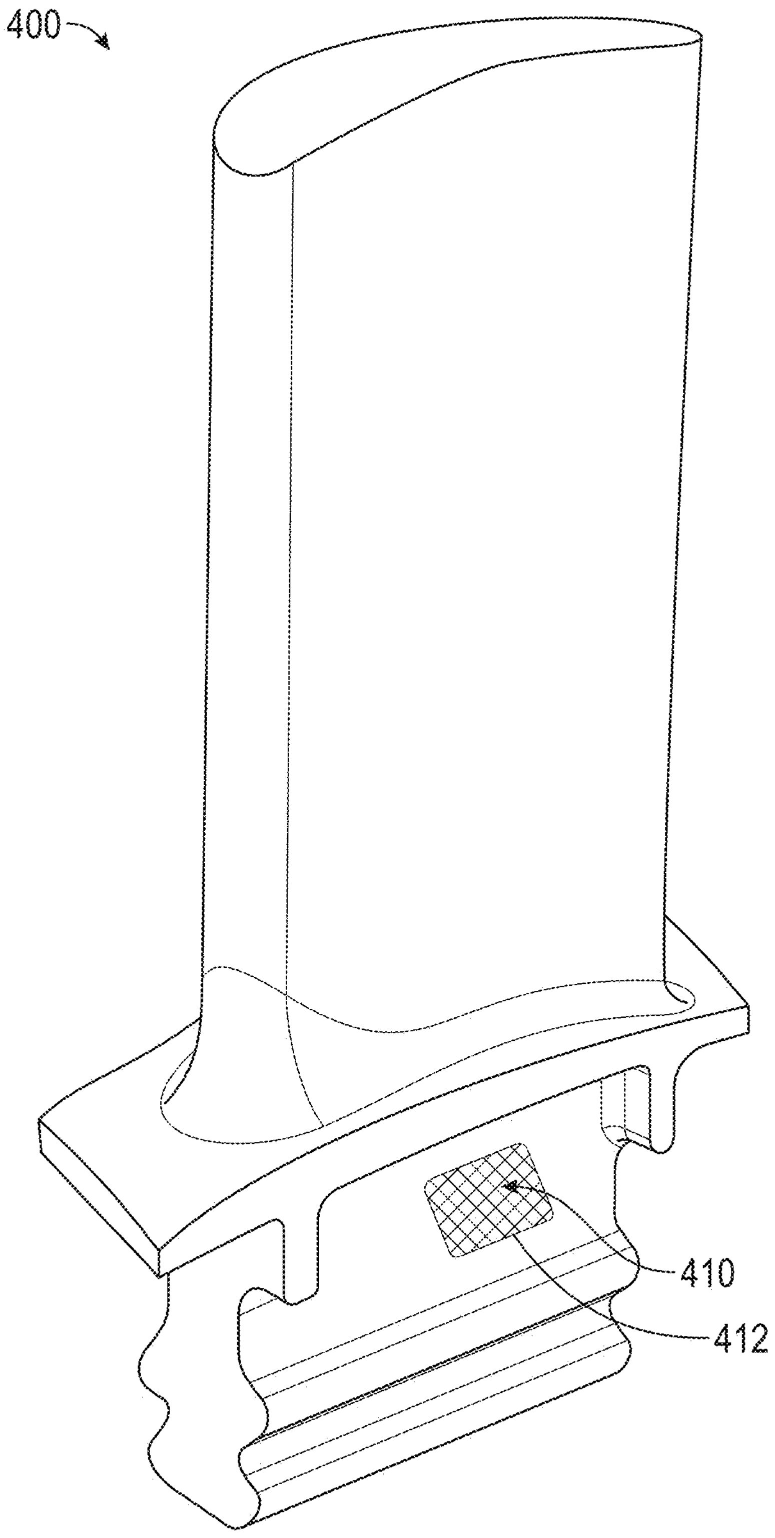
FIG. 4 is a fan blade of a gas turbine engine having an indicator associated therewith according to an embodiment described herein.

FIG. 4 depicts a fan blade 400 of a gas turbine engine (e.g., the gas turbine engine 20 of FIG. 1) having a unique pattern 410 associated therewith according to an embodiment described herein. Similar to the guide vane 300 of FIG. 3, the unique pattern 410 is located within a designated surface area 412 on the fan blade 400. The designated surface area 412 is a known, pre-determined area that can be scanned to identify the component by recognizing the unique pattern 410. The designated surface area 412 may be the same for each fan blade 400 such that the location of the designated surface area 412 is known.

With reference to one or more of the guide vane 300 of FIG. 3 and/or the fan blade 400 of FIG. 4, the designated surface areas 312, 412 can be located in a non-gas-path-flow location of the gas turbine engine 20. This prevents air, gas, heat, etc., from interacting with the unique patterns 310, 410 respectively to maintain their integrity and prevent wear. In examples, the designated surface areas 312, 412 are located on an un-machined surface of the component. This also enables the unique patterns 310, 410 to be maintained without being altered by a machining or other post-processing technique.

Figure 5:
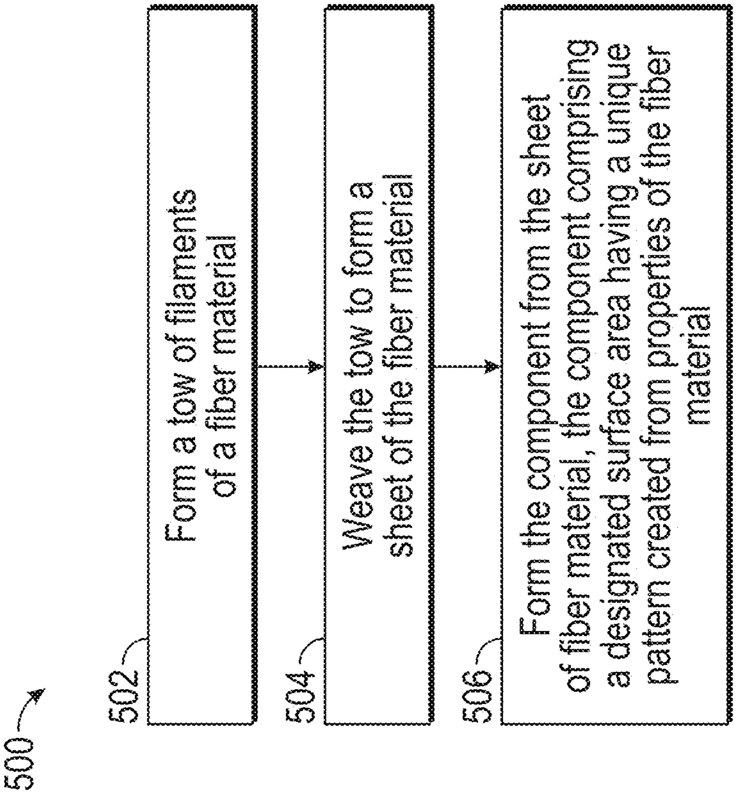
FIG. 5 is a flow diagram of a method of manufacturing a component of a gas turbine engine according to an embodiment described herein.

FIG. 5 depicts a flow diagram of a method 500 of manufacturing a component of a gas turbine engine (e.g., the gas turbine engine 20 of FIG. 1) according to examples of the present disclosure.

At block 502, a tow of filaments of a fiber material is formed by bundling together the filaments. The fiber material can be, for example, ceramic matrix composite material, organic matrix composite material, or the like. At block 504, the tow is woven together with other tows to form a sheet of the fiber material.

At block 506, the component is formed from the sheet of fiber material. The component includes a designated surface area (e.g., the designated surface areas 312 and 412 of FIGS. 3 and 4 respectively) having a unique pattern (e.g., the unique patterns 310 and 410 of FIGS. 3 and 4 respectively) created from properties of the fiber material. Properties of the fiber material include the arrangement of filaments in the tows, variations in thicknesses between filaments, and other properties or attributes of the fiber material that may differ from component to component, thus causing the properties to create the uniqueness of the unique identifier. In some examples, the unique pattern is created from the properties of the fiber material as described herein as well as properties of the tow, which can include the arrangements of tows, variations in thicknesses between tows, and the like.

The component can be, for example, a guide vane (e.g., the guide vane 300 of FIG. 3) of the gas turbine engine, a fan blade (e.g., the fan blade 400 of FIG. 4) of the gas turbine engine, or another component of the gas turbine engine.

In examples, the designated surface area is located in a non-gas-path-flow location of the gas turbine engine. In other examples, the designated surface area is located on an un-machined surface of the component.

In some examples, the component is formed from multiple sheets of the fiber material. For example, multiple sheets of the fiber materials can be layered to form the component. In such examples, the designated surface area is on an outermost sheet of the multiple sheets of the fiber material.

Additional processes also may be included. For example, the method 500 can include rigidizing the component subsequent to forming the component to prevent the properties of the fiber material from changing. It should be understood that the process depicted in FIG. 5 represents an illustration, and that other processes may be added or existing processes may be removed, modified, or rearranged without departing from the scope of the present disclosure.

Figure 6:
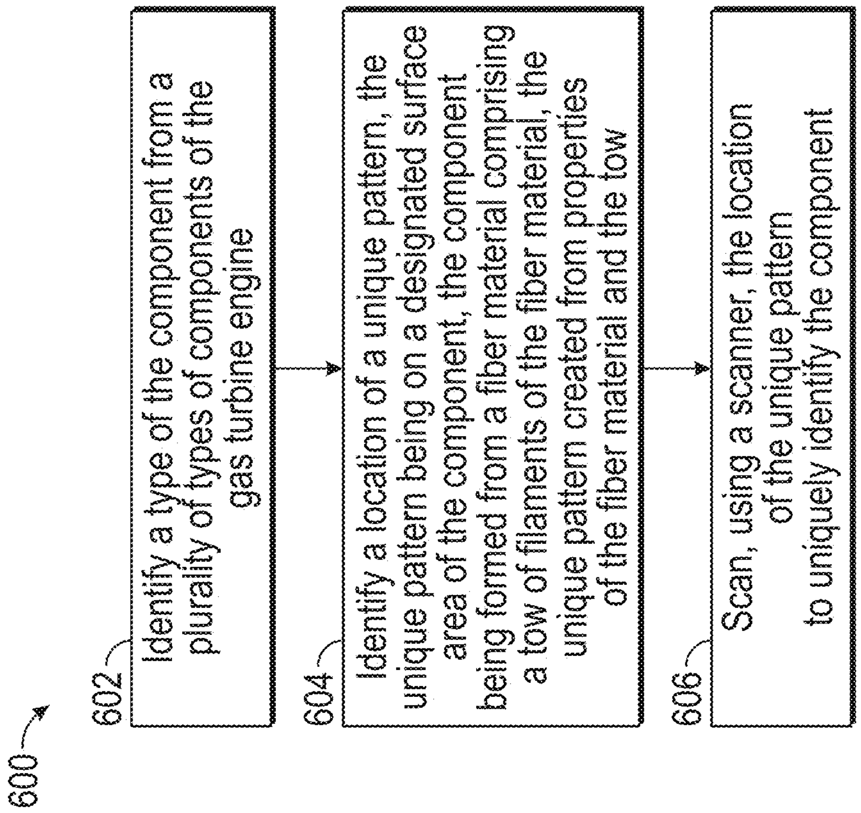
FIG. 6 is a flow diagram of a method for identifying a component of a gas turbine engine according to an embodiment described herein.

FIG. 6 depicts a flow diagram of a method 600 for identifying a component of a gas turbine engine according to examples of the present disclosure.

At block 602, a type of the component is identified from a plurality of component types of a gas turbine engine. For example, a type of the component can be a guide vane, a fan blade, etc. Thus, at block 602, it is determined what type of component the component is.

At block 604, a location of a unique pattern is identified on a designated surface area of the component. For example, if the type of the component is a guide vane, a known location for unique patterns for guide vanes is identified. The unique pattern is on the designated surface area of the component. The component is formed from a fiber material having a tow or tows of filaments of the fiber material, and the unique pattern is created from properties of the fiber material and the tow.

At block 606, a scanner (e.g., the scanner 760 of FIG. 7 described herein) scans the location of the unique identifier to uniquely identify the component. The scanner can be an optical scanner, a laser scanner, or another suitable scanner.

Additional processes also may be included. For example, the method 600 can include receiving, from a database, data about the component based on the unique identifier. That is, once scanned, the unique identifier can be used to retrieve data about the component associated with the scanned unique identifier. It should be understood that the process depicted in FIG. 6 represents an illustration, and that other processes may be added or existing processes may be removed, modified, or rearranged without departing from the scope of the present disclosure.

Figure 7:
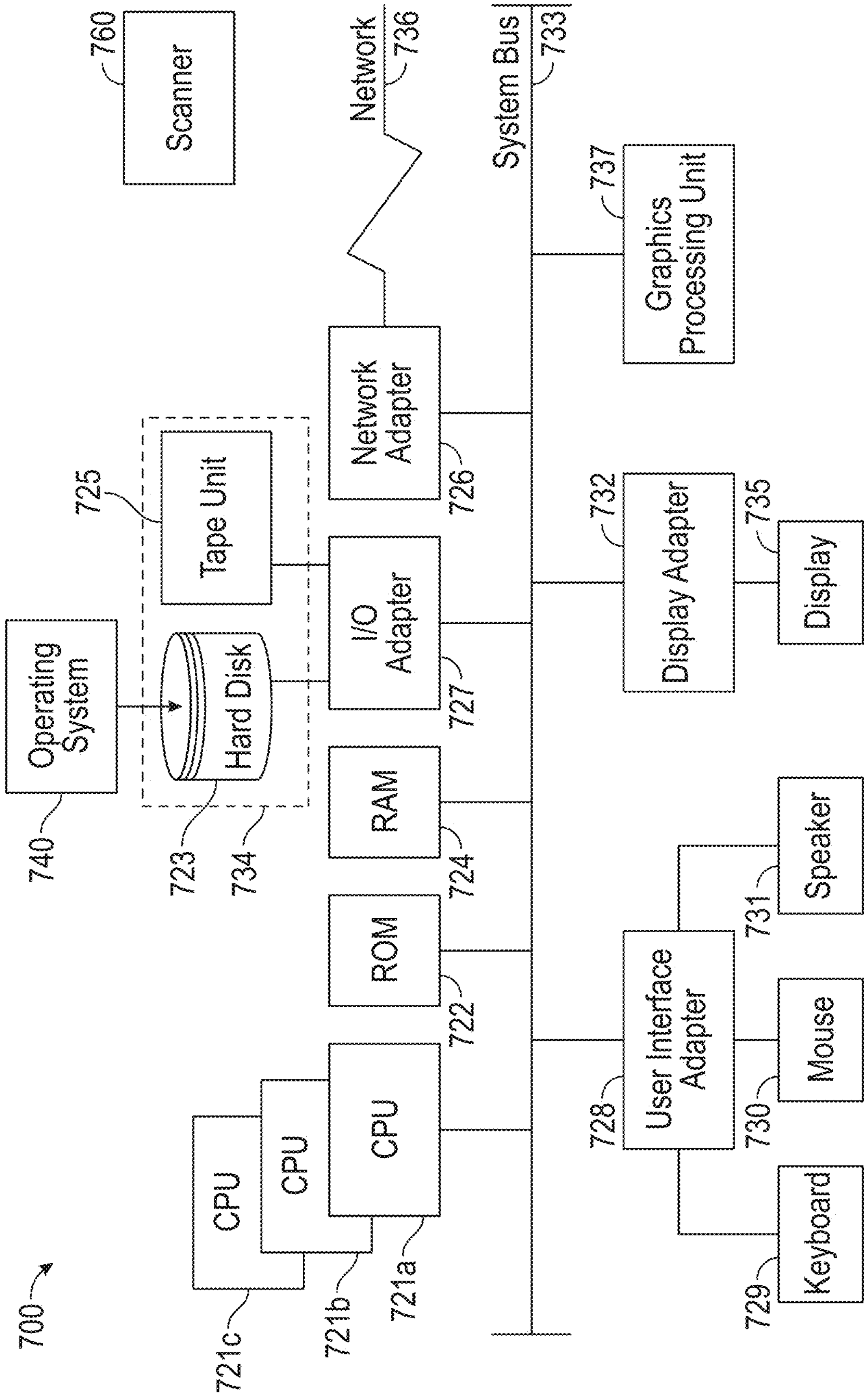
FIG. 7 is a block diagram of a processing system for implementing the presently described techniques according to one or more embodiments described herein.

It is understood that one or more embodiments described herein is capable of being implemented in conjunction with any other type of computing environment now known or later developed. For example, FIG. 7 depicts a block diagram of a processing system 700 for implementing the techniques described herein. In examples, processing system 700 has one or more central processing units ("processors" or "processing resources") 721*a*, 721*b*, 721*c*, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in processing system 700.

The processing system 700 can also be communicatively coupled to a scanner 760, either directly (by wired or wireless communication) or indirectly (via the outside network 736. The scanner 760 can be a laser scanner, an optical scanner, or another suitable scanner configured to scan a location associated with a unique identifier on a component formed from a fiber material and identify the component based on the unique identifier.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a component of a gas turbine engine comprising:

forming a tow of filaments of a fiber material;

weaving the tow together with other tows to form a sheet of the fiber material, wherein the weave forms a unique pattern;

forming the component from the sheet of fiber material;

designating a surface area of the component for scanning, the designated surface area having the unique pattern; and scanning the designated surface area to identify the component by the unique pattern.

2. The method of claim 1, wherein the fiber material is ceramic matrix composite material.

3. The method of claim 1, wherein the fiber material is an organic matrix composite material.

4. The method of claim 1, wherein the component is a guide vane of the gas turbine engine.

5. The method of claim 1, wherein the component is a fan blade of the gas turbine engine.

6. The method of claim 1, wherein the designated surface area of the component is located in a non-gas-path-flow location.

7. The method of claim 1, wherein the designated surface area of the component is located on an un-machined surface of the component.

8. The method of claim 1, further comprising:

rigidizing the component subsequent to forming the component to prevent the properties of the fiber material from changing.

9. The method of claim 1, wherein the unique pattern is created from the properties of the fiber material and properties of the tow.

10. The method of claim 1, wherein forming the component from the sheet of fiber material comprises forming the component from a plurality of sheets of the fiber material, wherein the designated surface area is on an outermost sheet of the plurality of sheets of the fiber material.

11. A method of manufacturing a component of a gas turbine engine, comprising:

forming a tow of filaments of a synthetic fiber composite material;

weaving the tow together with other tows to form a sheet of the synthetic fiber composite material, wherein the weave forms a unique pattern;

determining a minimum size of a designated surface area which ensures the uniqueness of a unique pattern created from properties of the synthetic fiber composite material within the designated surface area; and forming the component from the sheet of synthetic fiber composite material;

designating the surface area of the component for scanning, the designated surface area having the minimum size; and scanning the designated surface area to identify the component by the unique pattern.

12. The method of claim 11, wherein the synthetic fiber composite material is ceramic matrix composite material, or an organic matrix composite material.

13. The method of claim 11, wherein the component is a guide vane of the gas turbine engine, or a fan blade of the gas turbine engine.

14. The method of claim 11, wherein the designated surface area of the component is located in a non-gas-path-flow location.

15. The method of claim 11, wherein the designated surface area of the component is located on an un-machined surface of the component.

16. The method of claim 11, further comprising rigidizing the component subsequent to forming the component to prevent the properties of the fiber material from changing.

17. The method of claim 11, wherein the unique pattern is created from the properties of the synthetic fiber composite material and properties of the tow.

18. The method of claim 11, wherein forming the component from the sheet of synthetic fiber composite material comprises forming the component from a plurality of sheets of the synthetic fiber composite material, wherein the designated surface area is on an outermost sheet of the plurality of sheets of the synthetic fiber composite material.

* * * * *